US006319526B1

United States Patent
Dahlstrom et al.

(10) Patent No.: US 6,319,526 B1
(45) Date of Patent: Nov. 20, 2001

(54) PASTA FILATA CHEESE

(75) Inventors: Donald G. Dahlstrom, Oneida, WI (US); James Wiegand, Circle Pines; William R. Aimutis, Blaine, both of MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

(21) Appl. No.: 09/478,321

(22) Filed: Jan. 6, 2000

(51) Int. Cl.[7] .................................................. A23C 9/12
(52) U.S. Cl. ............................................. 426/36; 426/582
(58) Field of Search ..................................... 426/582, 36

(56) References Cited

U.S. PATENT DOCUMENTS

| | | | |
|---|---|---|---|
| Re. 33,508 | 12/1990 | Kielsmeier et al. | 426/582 |
| 1,522,383 | 1/1925 | Parsons et al. | 426/582 |
| 1,523,678 | 1/1925 | Wheeler et al. | 99/453 |
| 2,021,899 | 11/1935 | Schneider | 99/11 |
| 2,319,187 | 5/1943 | Ingle | 99/115 |
| 2,446,550 | 8/1948 | North et al. | 99/116 |
| 2,576,597 | 11/1951 | Gootgeld | 99/116 |
| 2,733,148 | 1/1956 | Russo | 99/116 |
| 2,789,909 | 4/1957 | Flosdorf et al. | 99/115 |
| 2,816,036 | 12/1957 | Lederer | 99/116 |
| 3,078,170 | 2/1963 | Leber | 99/116 |
| 3,169,381 | 2/1965 | Persson | 62/57 |
| 3,184,318 | 5/1965 | McCadam et al. | 99/115 |
| 3,347,181 | 10/1967 | Pizzo | 107/54 |
| 3,354,049 | 11/1967 | Christensen | 195/100 |
| 3,445,241 | 5/1969 | Pontecorvo et al. | 99/116 |
| 3,615,586 | 10/1971 | Rohlfs et al. | 99/115 |
| 3,615,679 | 10/1971 | Tangel et al. | 99/86 |
| 3,667,963 | 6/1972 | Katter et al. | 99/86 |
| 3,692,540 | 9/1972 | Mauk | 99/116 |
| 3,694,231 | 9/1972 | Izzo et al. | 99/115 |
| 3,761,284 | 9/1973 | Foster, Jr. et al. | 99/117 |
| 3,852,158 | 12/1974 | Anderson et al. | 195/100 |
| 3,859,446 | 1/1975 | Sullivan et al. | 426/36 |
| 3,900,574 | 8/1975 | Warwick | 426/274 |
| 3,961,077 | 6/1976 | Kielsmeier | 426/36 |
| 3,966,970 | 6/1976 | Williams | 426/393 |
| 3,998,700 | 12/1976 | Reinhold et al. | 195/96 |
| 4,012,534 | 3/1977 | Kichline et al. | 426/582 |
| 4,053,642 | 10/1977 | Hup et al. | 426/36 |
| 4,066,800 | 1/1978 | Rosenau et al. | 426/582 |
| 4,075,360 | 2/1978 | Rule et al. | 426/582 |
| 4,091,721 | 5/1978 | Cosmi | 99/453 |
| 4,110,476 | 8/1978 | Rhodes | 426/41 |
| 4,112,835 | 9/1978 | Moniello | 99/455 |
| 4,115,199 | 9/1978 | Porubean et al. | 195/96 |
| 4,143,175 | 3/1979 | Whelan et al. | 426/582 |
| 4,159,349 | 6/1979 | Caiello | 426/94 |
| 4,197,322 | 4/1980 | Middleton | 426/36 |
| 4,226,888 | 10/1980 | Siecker | 426/36 |
| 4,283,431 | 8/1981 | Giordano et al. | 426/296 |
| 4,285,979 | 8/1981 | Izzi | 426/94 |
| 4,339,468 | 7/1982 | Kielsmeier | 426/582 |
| 4,367,243 | 1/1983 | Brummett et al. | 426/303 |
| 4,372,979 | 2/1983 | Reinbold et al. | 426/36 |
| 4,416,904 | 11/1983 | Shannon | 426/19 |
| 4,460,609 | 7/1984 | Kristiansen et al. | 426/39 |
| 4,461,781 | 7/1984 | Akesson et al. | 426/524 |
| 4,552,774 | 11/1985 | Gronfor | 426/582 |
| 4,588,612 | 5/1986 | Perkins et al. | 427/213 |
| 4,626,439 | 12/1986 | Meyer | 426/517 |
| 4,669,254 | 6/1987 | Muzzarelli | 53/518 |

(List continued on next page.)

FOREIGN PATENT DOCUMENTS

| | | |
|---|---|---|
| 561821 | 8/1984 | (AU) . |
| 0294018 | 12/1988 | (EP) . |
| 2 551 955 | 9/1983 | (FR) . |
| 2075326 | 11/1981 | (GB) . |

OTHER PUBLICATIONS

Fox. 1987. Cheese Chemistry, Physics and Microbiology, vol. 2. Elsevier Applied Science, New York. p. 226–233.*

Kosikowski. 1977. Cheese and Fermented Milk Foods, 2nd Edition, Distributed by Edwards Brothers Inc, Ann Arbor Michigan, p. 179–188.*

Potter, N:*Food Science*, 1933, Avi Publishing Co., Inc., pp. 223–224.

M.A. Cervantes: Effects of Salt Concentration and Freezing on Mozzarella Cheese Texture, Journal of Dairy Science, vol. 66, No. 2, pp. 204–2113 (1983).

21 CFR §§ 133.169, 133.170, 133.173, 133.174, 133.178.

Ripening Changes in Cephalotyre 'Ras' Cheese Slurries, Attia A. Abdel Baky, et al., Journal of Diary Research (1982).

Process Cheese Principles, Lawrence A. Shimp, Food Technology (1995).

Modified es: Properties and Uses, O.B. Wurzburg, ed., CRC Press Inc. (1986) pp. 13–18, 55–56, 79, 89, 97, 113, 131, 149 and 179.

H. Luck; Preservation of Cheese and Perishable Dairy Products by Freezing; S. Afr. Dairy Technol. (1977) vol. 9, No. 4; pp. 127–132.

Brochure; FloFreeze MA; Sep. 1983.

*Primary Examiner*—Carolyn Paden
(74) *Attorney, Agent, or Firm*—Kinney & Lange, P.A.

(57) ABSTRACT

The present invention includes a process of manufacturing a mozzarella variety of cheese or a mozzarella-like cheese wherein a milk composition is pasteurized and formed into a coagulum. The coagulum is cut to separate curd from whey and the whey is drained therefrom. The curd is then heated preferably in a liquid-free environment and mechanically worked until the curd forms a fibrous mass. The cheese is then formed into a selected shape. Additionally, generally recognized as safe (GRAS) ingredients are added after the whey is drained but prior to heating the curd. In addition, the curd may be comminuted to a selected size after the whey is drained.

113 Claims, No Drawings

U.S. PATENT DOCUMENTS

| | | | |
|---|---|---|---|
| 4,687,672 | 8/1987 | Vitkovsky | 426/524 |
| 4,695,475 | 9/1987 | Zwiercan et al. | 426/582 |
| 4,744,998 | 5/1988 | van Gennip et al. | 426/582 |
| 4,753,815 | 6/1988 | Kielsmeier et al. | 426/582 |
| 4,847,107 | 7/1989 | Linse-Loefgren | 426/582 |
| 4,894,245 | 1/1990 | Kielsmeier et al. | 426/68 |
| 4,919,943 | 4/1990 | Yee et al. | 426/39 |
| 4,937,091 | 6/1990 | Zallie et al. | 426/582 |
| 4,940,600 | 7/1990 | Yokoyama et al. | 426/582 |
| 4,997,670 | 3/1991 | Kielsmeier et al. | 426/582 |
| 5,030,470 | 7/1991 | Kielsmeier et al. | 426/582 |
| 5,080,913 | 1/1992 | Gamy | 426/39 |
| 5,104,675 | 4/1992 | Callahan et al. | 426/582 |
| 5,200,216 | 4/1993 | Barz et al. | 426/36 |
| 5,225,220 | 7/1993 | Gamay | 426/39 |
| 5,234,700 | 8/1993 | Barz et al. | 426/42 |
| 5,350,595 | 9/1994 | Hockenberry et al. | 426/582 |
| 5,380,543 * | 1/1995 | Barz | 426/582 |
| 5,395,630 | 3/1995 | Gamay | 426/39 |
| 5,466,477 | 11/1995 | Sevenich | 426/582 |
| 5,470,595 | 11/1995 | Kopp et al. | 426/231 |
| 5,484,618 | 1/1996 | Barz et al. | 426/304 |
| 5,567,464 | 10/1996 | Barz et al. | 426/582 |
| 5,902,625 | 5/1999 | Barz et al. | 426/582 |
| 5,925,398 | 7/1999 | Rizvi et al. | 426/582 |

* cited by examiner

PASTA FILATA CHEESE

BACKGROUND OF THE INVENTION

The present invention relates to a process for manufacturing pasta filata cheese varieties and/or mozzarella-like products.

In the manufacture of pasta filata cheeses like Mozzarella, curd solids are typically heated in a hot water bath. When the individual curd particles begin to flow together the mass is subsequentially pulled apart and folded back over to develop characteristic fibrous internal texture and smooth outer surfaces.

Spent hot water containing cheese solids, salt and energy is a major economic concern when considering commercial mozzarella cheese manufacture. Such losses represent lost manufacturing opportunity as well as high BOD, salinity, and thermal environmental pollution. Commercial mozzarella cheese facilities typically lose 5% curd fat during this unique pasta filata manufacturing step. Only a portion of that fat loss is recoverable as whey cream. Approximately 0.045 gallon spent mixer water volume is developed per pound finished mozzarella cheese. A commercial mozzarella cheese manufacturer could expect to pay for disposal of 4,500 gallons mixer water with over 1,100 pounds dry solids (including 900 pounds sodium chloride) per 100,000 pounds finished cheese per day.

Elimination or at least reduction in quantity of such spent hot water would be beneficial in terms of production cost (improved vat milk to finished cheese solids retention) as well as harm to the natural environment.

Cheese compositional and functional variations continue to be a major concern for both cheese manufacturers and users of the cheese. Controlling viable microbial count, fat content, moisture, salt content, acidity and refrigerated shelf stability improves cheese consistency. The pizza industry, as well as other users of cheese, continues to expect mozzarella cheese varieties and/or mozzarella-like styles of cheese that can be used over a broader range of applications. A greater variety of pizzas, changes in oven styles, cooking conditions and the like continue to be developed so as to maintain and/or increase the pizza maker's market-share. However, such changes affect the performance of the cheese. For example, the portioning of the cheese and/or amount of heat available during the cooking process to melt the cheese may be affected. By portioning is meant the ease of dividing into portions the cheese once it is melted. Portioning in turn relies on the cut integrity and firmness of the cheese when in the molten state. Changes in the amount of heat available for cooking result in differences in overall melt performance and flavor of the mozzarella cheese on the finished, baked pizza. Despite all the changes, it is still desired by the pizza industry that the portioning of the cheese improve, or at least not suffer, while the melt and flavor characteristics of the cheese remain the same.

Added to this, any changes that a cheese manufacturer may make in an attempt to achieve a more consistent functional product for a specific application may impact the handling and portioning of the cheese, such as when cutting a pizza. Thus a product which performs and meets the melt and flavor characteristics, yet does not handle/portion satisfactorily, is not acceptable. As regards portioning, in an attempt to control food costs, greater accuracy as to the free flowing, cut integrity of the product is required. Diced, sliced or shredded cheese that sticks to the cutting surface is difficult to handle. Such cheese requires more equipment cleanup and results in reduction in amount of usable cheese per purchased unit.

Upon baking the pizza, cheese is supposed to melt such that it loses its original shape and exhibits controlled "stringy" characteristics. However, such characteristics may vary from batch to batch. Cheeses made under conventional processes may melt too much or too little.

Process cheeses (non-pasta filata cheese) have more consistency from batch to batch, however, process cheese lacks the desired "stringy" characteristics. Even when process cheese is formulated to improve its melt characteristics, process cheese typically does not release sufficient milk fat when melted in a pizza environment and a tough burnt cheese layer results. Prior to this invention, manufacturers of mozzarella-like products have been limited in their control of performance characteristics of mozzarella cheese for use in a broad range of applications. The end user, especially the maker of pizza's, has had to accept cheese that may not be consistently uniform from vat to vat as well as at different times of the year.

The application of mozzarella cheese varieties and mozzarella-like products continue to grow and expand within the pizza industry, as well as its use in the food service/institutional industries. One reason for the continued growth is that the performance characteristics of mozzarella cheese even with its short comings have made it preferable over other varieties when used as an ingredient in some complex foods such as pizza.

One of mozzarella cheeses' most important attributes is its melting characteristics when baked as compared to other cheeses. These characteristics include melt down (time to melt), stretch, blistering/browning, and flavor. In general, melting is a function of the amount, rate, and/or source of heat over a specified time that is being transferred to the cheese during baking. Similar melt characteristics should be expected when keeping the amount and/or source of heat and the baking time constant for any application of mozzarella cheese. However, the natural variation in composition and seasonality of mozzarella cheese in terms of melt characteristics can differ substantially from one manufacturing vat to the next. It is even possible to have variations within a vat because of ongoing acid and protein changes during fermentation by viable microbial starters. Further variations to the mozzarella cheese are introduced by cooking conditions. For example, the style of pizza being prepared may vary the melt characteristics. Varying amounts of ingredients, thickness of crust and types of ingredients all enter into changing the melting environment of the mozzarella cheese. Additionally, the type of oven used and the time of baking also has a significant impact on the amount and the source of heat available for melting the mozzarella cheese.

BRIEF SUMMARY OF THE INVENTION

The present invention includes a process of manufacturing a mozzarella or mozzarella-like cheese wherein a milk composition is pasteurized and formed into a coagulum. The coagulum is cut to separate curd from whey and the whey is drained therefrom. The curd is then heated preferably in a fluid-free state and mechanically worked until the curd forms a fibrous mass. The cheese is then formed into a selected shape.

Additionally, generally recognized as safe (GRAS) ingredients are added after the whey is drained but prior to heating the curd. In addition, the curd may be comminuted to a selected size after the whey is drained.

DETAILED DESCRIPTION

The present invention includes a process for making a pasta filata type cheese. Most common of such cheeses are mozzarella and provolone. Traditional manufacturing processes for making such cheese varieties are characterized by the fact that after the whey is drained off, the curd is immersed in hot water or hot whey and the submerged curd is worked and stretched while it is in a plastic condition to impart into the curd, the fibrous texture that characterizes such cheese varieties.

According to the process of the present invention, the working of the mozzarella curd in a hot liquid is eliminated. The working of the curd occurs in a substantially liquid-free environment. By liquid-free is meant that the curd is not immersed in a liquid such as water or whey. The curd does have water entrapped within and may have some surface wetness, but such moisture content is insufficient to be considered immersion.

In addition, the mozzarella curd is comminuted into fine granules after the curd is cut and the whey is drained. The curd is worked in a vessel at an elevated temperature in a dry state. The result is a pasta filata-cheese that has excellent texture and taste while retaining the fibrous texture that characterizes traditional made mozzarella cheese.

It has also been discovered that by the addition of various ingredients such as generally recognized as safe (GRAS) ingredients to the mozzarella curd before it has been heated results in improved control of analytical and functional characteristics. Such GRAS ingredients are typically added to process cheese and imitation cheeses. For example, an emulsifier can be added to the cheese curd after the curd is cut but before it is heated. Random variations can be noticeably reduced such that consistency in functional characteristics and production costs are improved.

Adding GRAS ingredients after cutting of the curd but before heating has been found not to be limited to any specific type of mozzarella process. The addition of the ingredients before heating is independent of the final form in which the mozzarella cheese is packaged, that is, whether it is formed into a block, diced/shredded, held refrigerated, and/or frozen. The mozzarella cheese produced by the process of the present invention produces a cheese that has a relatively longer storage period and while retaining its functional characteristics when baked on a pizza. Typically mozzarella shelf life is one month. After one month, traditional mozzarella loses some of its functional characteristics. The mozzarella cheese produced by the process of the present invention has a shelf life of at least two months and up to six months while still retaining its functional characteristics such as its fibrous texture, meltdown, stretch, blistering/browning, flavor and the like.

The difference between pasta filata cheese relative to process and imitation cheese varieties may be due, at least in part, to the cheese protein component being only partially modified and under emulsified during heating and subsequent kneading. That partial modification may simply be a controlled removal of calcium bound to the coagulated cheese protein matrix. Sufficiently bound calcium could still remain intact within the matrix which results in maintaining melt characteristics such as melt flow, stringiness, and cohesiveness. Process and imitation cheese formulations typically involve comparatively higher levels of emulsifying salts. Manufacture of process and imitation cheese varieties typically involve heat pasteurization temperatures above 170° F. The maximum heat treatment in the present invention is similar to current practices for mozzarella and provolone cheese which is below pasteurization conditions.

The process of the present invention initially starts out in a traditional manner. The composition of fresh milk is adjusted to obtain the desired fat to protein ratio and fat content of the final cheese. Cow's milk is preferred due to its availability, but other sources of milk traditionally used in making mozzarella cheese may also be used. For example, fresh cow's milk is standardized by fat removal to produce sweet cream and/or adding skim milk. Alternatively, recombined milk may be used as a starting milk composition. The recombined milk may be prepared from protein concentrate, acid casein, caseinates, non-fat dry milk, whey, whey protein concentrate, whey protein isolate, cream, condensed milk or a combination of any two or more of the aforementioned ingredients.

The standardized cow's milk is then pasteurized and thereafter cooled to a range of 85° to 100° F. The milk is acidified before or after pasteurization using any one of a number of substances or a combination thereof. The milk may be directly acidified with a mineral or organic acid or a microbial starter or any other acidulent. The milk is set (coagulated) with rennet or other suitable proteolytic agent.

After the milk has gelled, the curd is cut, curd and whey are heated after which the fluid whey is drained off. The remaining solid curd is then worked in a dry state. Preferably the pH of the fresh curd is in the range of between 5.8 to 5.4. The pH can be adjusted using an organic or mineral acidulant to achieve the desired final curd blend pH range of 5.0–5.4. The curd is preferably comminuted to a fine granular or paste-like form prior to working. In addition, various GRAS ingredients maybe added to the comminuted curd.

The GRAS ingredients may be added before the curd is comminuted or thereafter, but in any event, the GRAS ingredients are added prior to heating and working the curd.

One GRAS ingredient includes a prepared emulsifying salt combination. The salt combination includes simple or complex chlorides, sulfates, phosphates or citrates that are commonly added to emulsify process cheese, cheese food, cheese spread, cheese sauce, imitation or analog cheeses. The salt is preferably an alkaline earth salt such as sodium, potassium, calcium, or magnesium. Alternatively, this functional salt blend may be an ingredient of the initial starter culture growth medium. Inclusion of such a salt combination in the prior production of starter would serve to: (1) control bacteriophage proliferation, (2) buffer developed lactic acidity maximizing potential starter cell density, (3) select for desired microbial populations (inhibit cellular reproduction of salt sensitive microbes) and/or (4) as a method of ionic chemical control of ripened starter. In the present invention, the GRAS salt levels in mozzarella cheese would only be 10–30% of that currently used to manufacture pasteurized process cheese.

Non-dairy components may be added to the curd prior to working. Such non-dairy components may include functional carbohydrates (starches, gums, pectin), lipase, protease, mineral acid, organic acid (citric acid or lactic acid for flavor), structural protein (soy protein or wheat protein), natural or artificial flavors and anti-microbial agents. Such anti-microbial agents may be derived from natural (fermented) or artificial sources (sorbic acid).

Dairy ingredients may also be added prior to working of the curd. Dairy ingredients are added to enhance or change flavor, change protein to fat ratio or concentration. Exemplary dairy ingredients include dry, condensed, fluid, unripened, fermented, pH reduced: milk, cream, yogurt, skim solids or cheese.

Whether the ingredients are salt mixtures, non-dairy or dairy ingredients, they may be added in aqueous form anywhere from 5 to 50% on a weight basis.

Preferably the curd has a finished moisture content of 20 to 80%, and most preferable 30 to 60 weight %. The moisture content of the curd may be adjusted in any number of ways including adding inert ingredients such as structural carbohydrates or silicates.

Prior to working, the curd mass is preferably comminuted by chopping or grinding. The ground, diced or chopped curd dimensions preferably range from the appearance of uniform paste to units as large as 1"×6"×15".

After grinding, the curd of the present invention is preferably worked in a dry environment. By working is meant that the curd is heated and then mechanically kneaded and stretched to a viscous molten state wherein the curd develops into a fibrous mass. By fibrous is meant that the curd develops texture. One characteristic of such a fibrous cheese mass is that the curd will form long threads when stretched. The curd is preferably heated to a temperature range of 130° to 160° F. Steamed-jacketed and/or infused vessels equipped with mechanical agitators (waterless cookers) are used to heat and work the curd blend. The curd blend may also be heated and worked in horizontal cookers that employ screw-augers to stir or work the curd while live steam is injected directly into the cheese. Another equipment option is direct culinary steam injection into flowing curd mass. This is continuous process cheese cooker technology as opposed to individual batch equipment Working the curd in a liquid-free environment results in several advantages unique to the present invention. First, loss of various solids such as protein, fat or additives is minimized if not eliminated since no effluent is created thereby increasing yield. Second, a liquid-free working environment has little if any costs associated with traditional liquid effluent disposal. Third, since there is no leaching of added ingredients into an effluent, more precise or controlled addition of ingredients is achieved. Fourth, enzymatic activity is reduced. In addition, secondary fermentation is also reduced.

The addition of GRAS ingredients may be done in a temperature range of between 20° F. and 160° F. The blending of such ingredients can be done in a twin screw auger type mixer in which the augers overlap thereby insuring thorough mixing. The preferred capacity of such blending equipment is that it holds at least one batch of fresh curd plus the GRAS ingredients. A number of such blenders may be required to insure that the flow of the cheese curd is continuous to the subsequent heating and kneading steps. The number of blenders required is determined by dwell time in the blenders that is required to adequately mix all the ingredients and the through put required in the subsequent heating and kneading steps.

Heat treatments in the present invention are similar to current practices for traditional mozzarella and provolone cheese. Such molten mozzarella cheese texture development temperatures, commonly in the range of 135–150° F., are well below the pasteurization conditions seen in current manufacture of process cheese (in excess of 175° F. for extended time periods). Various functional differences seen when comparing baked mozzarella to process cheese may in part be related to these initial manufacturing temperatures. The comparative functionality of baked mozzarella and process cheeses may be a reflection of selectively modifying cheese protein, namely the chemistry of renneted casein. For proper baked mozzarella functionality (stretch and mouthfeel) such cheese protein structure may need to be limited to partial modification as opposed to the fully emulsified condition of process cheese protein.

A proper amount and/or ratio of protein-bound calcium to total casein may be required for adequate baked mozzarella melt, cohesive stretch and stringiness functionality. To much calcium bound to mozzarella cheese casein (pH too high, excessive levels of available calcium) could lead to poor fat incorporation during manufacture, and then insufficient melt and burning when baked by the final customer. Too little bound calcium within the protein matrix could result in cheese with excessive melt and associated soft/soupy mouthfeel. Comercial shelf-life of mozzarella is commonly limited by these same apparent 'too little bound calcium' baked cheese attributes.

Selective fat release during mozzarella baking is another important characteristic and typically process cheese is too completely emulsified. Burnt process cheese on finished pizza is a common defect.

Salts and temperature levels outlined in the present application during mozzarella cheese manufacture are important distinctions relative to current process cheese practices. With the present invention, cheese manufacturers could modify baked mozzarella cheese functionalities such as melt, fat release, browning/blistering, stretch, string, and mouthfeel by changing the level of salts, and heating temperatures along with current fat, moisture, sodium chloride and pH control measures commonly know to one practicing in the art.

After the curd has been adequately worked, it is characterized by a uniform smooth appearance. The hot plastic curd mass is then transported via an extruder onto a chill roll or continuous belt. The resulting finished cheese product is held on the chill roll or the continuous belt until sufficiently solidified. The cheese may be formed into either a circular, oval or rectangular cross-sectional shape between 0.25 inch to 15 inches in diameter or width or both in a horizontal or vertical plane. The chilled extrudate can then be divided into finished selected dimensions. Alternatively, the finished cheese product may be directly extruded into packaging while hot, and then cooled. The packaged cheese may be held refrigerated or frozen for further use.

It has been discovered that the process of the present invention and the resulting products manufactured by the process are able to meet virtually any desired performance characteristics under a more diverse set of applications. The following Examples are illustrative only and are not intended to limit the present invention in any way.

EXAMPLE I

Approximately 7,000 lbs. of Mozzarella cheese curd was manufactured using the process described in the Bartz et al. U.S. Pat. No. 5,200,216 (hereby incorporated herein by reference). As described in the Bartz et al. patent, pasteurized cows' milk was converted into a cheese milk by fermenting the milk with lactic acid producing bacteria. The resulting product was a fresh curd that had a moisture content of 50.04%, 38.7% FDB (fat on a dry basis), a pH of 5.29, and a salt content of 0.5%. Approximately 57.5 lbs of the fresh curd was removed for this example and the remaining fresh curd was finished into mozzarella cheese in the traditional manner wherein the curd was heated, kneaded and stretched in an aqueous solution, and thereafter extruded directly into cold brine. The approximately 57.5 lbs of fresh mozzarella curd was blended with the following GRAS ingredients:

| Ingredient | Weight (pounds) |
| --- | --- |
| skim cheese powder | 2.00 |
| salt (sodium chloride) | 0.50 |
| sodium citrate dihydrate | 0.50 |
| anhydrous citric acid | 0.15 |

The mozzarella curd (which was unsalted/0.2% salt) was blended in a pilot scale twin screw auger blender/cooker (Custom Stainless Equipment Company, Santa Rosa, Calif./Models: EDB.0718.FVX) for approximately 20 minutes. The curd was then heated from 99° F. to 150° F. within four (4) minutes using a combination of indirect and direct steam injection. The resulting cheese had a weight of approximately 61.6 lb and had a wet fat content of 17.76%, a moisture content of 48.61%, an FDB of 34.6%, a salt content of 1.72% and a pH of 5.29. The cheese produced by the process of this invention was comparable in cold flavor, cold shred identity, hot melt, oil, color, stretch, fiber and chewy texture similar to that portion processed in the traditional manner.

EXAMPLE II

A mozzarella cheese curd was manufactured by the process described in the Bartz et al. U.S. Pat. No. 5,200,216 which is hereby incorporated by reference. As described in the Bartz et al. patent, pasteurized cows' milk was converted into a cheese milk by fermenting the milk with lactic acid producing bacteria. A portion of the fresh curd was processed (finished) in a traditional manner which included heating, kneading and stretching in an aqueous solution, and then extruded into its final form. Another portion of the fresh cheese which was approximately 600 lb was further finished using the process of the present invention. The fresh curd had a 49.0% moisture content, 39.2% FDB, a pH of 5.25, and a salt content of 0.2% and a wet fat content of 20.0%

The curd was blended with the following ingredients

| Ingredient | Weight (pounds) |
| --- | --- |
| 42% fat whey cream | 33.00 |
| skim cheese powder | 18.00 |
| salt (sodium chloride) | 7.00 |
| sodium citrate dihydrate | 3.50 |
| ahydrous citric acid | 2.00 |

The curd and the above ingredients were blended in a commercial scale twin screw auger blender/cooker (Custom Stainless Equipment Company, Santa Rosa, Calif./Model: CDB.1845) for approximately 30 minutes and then the curd was heated from approximately 99° F. to 150° F. within 60 seconds using direct culinary steam injection.

The resulting cheese weighed 717.2 lb and had a wet fat content of 20.81%, a moisture content of 47.22%, an FDB of 39.43%, a pH of 5.35 and a salt content of 1.6%. The dry cream, skim cheese power and whey cream were added to compensate for culinary steam condensate plus to adjust fat as a percentage of total cheese solids. When compared to the portion of the cheese processed in the traditional manner, the cheese according to this example had similar analytical composition, cold flavor, cold shred identity, hot melt, oil release, color, stretch, fiber and chewy texture.

EXAMPLE III

A full fat cheese curd was manufactured as described in the Code of Federal Regulations 21.133.113. Pasteurized cow's milk was converted into a cheese milk by fermenting the milk with lactic acid-producing bacteria. The resulting curd had a 44.0% moisture content, 52% FDB, a pH of 5.25 and a salt content of 1.5%. A portion of the curd was segregated and was blended with GRAS ingredients such that the finished cheese dry fat and moisture composition would coincide with typical provolone composition requirements as described in the Code of Federal Regulations 21.133.181. The portion of segregated curd was approximately 680 lb of full fat curd having a wet fat content of 29.0%. The following ingredients were added to the curd:

| Ingredient | Weight (pounds) |
| --- | --- |
| Skim cheese powder | 40.00 |
| Sodium citrate dihydrate | 3.00 |
| Anhydrous Citric acid | 1.00 |

The ingredients and the curd were mixed in a commercial-scale, twin screw auger, blender/cooker (Custom Stainless Equipment, Santa Rosa, Calif./Model: CDB.1845) for approximately 30 minutes. The mixed curd was then heated from approximately 90° F. to 150° F. within 70 seconds using direct culinary steam injection. The finished cheese product weighed 754.2 lb and had a wet fat content of 26.25%, a moisture content of 44.38%, an FDB of 47.2%, and a salt content of 1.71%. The curd had a similar cold flavor, cold shred identity, hot melt, oil release, color, stretch, fiber and chewy texture relative to typical provolone cheese.

Although the present invention has been described with reference to preferred embodiments, workers skilled in the art will recognize that changes may be made in form and detail without departing from the spirit and scope of the invention.

What is claimed is:

1. A process of manufacturing, a pasta filata cheese or a mozzarella-like cheese comprising:
    providing a milk composition having a selected protein and fat composition;
    pasteurizing the milk composition;
    forming a coagulum from the milk composition;
    cutting the coagulum to separate curd and whey;
    draining the whey from the curd;
    heating the curd without aqueous immersion to an approximate temperature range of 130° F. to 160° F.;
    adding a cheese emulsifying salt or a dairy ingredient or both prior to mechanical working;
    mechanically working the curd into a fibrous mass; and
    forming the cheese into a selected shape.

2. The process of claim 1 wherein the curd is comminuted to a selected size.

3. The process of claim 1 wherein the coagulum is heated after being cut to facilitate moisture removal from the curd.

4. The process of claim 1 wherein the milk composition is fresh milk.

5. The process of claim 1 wherein the milk composition is recombined milk.

6. The process of claim 5 wherein the recombined milk is prepared from either protein concentrate, acid casein, rennet casein, caseinates, nonfat dry milk, whey, whey protein concentrate, whey protein isolate, cream, or condensed milk or any combination thereof.

7. The process of claim 1 wherein the salt composition includes an alkaline earth salt of simple or complex chlorides, sulfates, phosphates or citrates used in the manufacture of process cheese, cheese food, cheese spread, cheese sauce or imitation or analog cheeses.

8. The process of claim 7 wherein the alkaline earth salt contains sodium, potassium, calcium, magnesium or combination thereof.

9. The process of claim 7 wherein the salt composition if in dry form is mixed in an aqueous solution containing about five to fifty percent by weight of the salt composition.

10. The process of claim 1 wherein a non dairy ingredient is added to the curd prior to mechanical working.

11. The process of claim 1 wherein the non-dairy ingredient is a functional carbohydrate, a lipase, a protease, a mineral acid, an organic acid, a structural protein, or an antimicrobial agent or a combination thereof.

12. The process of claim 10 wherein the nondairy ingredient if in dry form is mixed in an aqueous solution containing about five to fifty percent by weight of the dairy ingredient.

13. The process of claim 1 wherein the dairy ingredient is either a milk, cream, yogurt, skim solids, or cheese that is dry, condensed, fluid, unripened, fermented or pH reduced or any combination thereof.

14. The process of claim 13 wherein if the dairy ingredient is in dry form is mixed in an aqueous solution containing about five to fifty weight percent of the dairy ingredient.

15. The process of claim 1 wherein a non-dairy ingredient is added to the curd via a starter culture medium.

16. The process of claim 1 wherein the cheese has a final moisture content in the range of about 20 to about 90 weight percent.

17. The process of claim 16 wherein the cheese has a final moisture content in the range of about 30 to 60 weight percent.

18. The process of claim 16 wherein the cheese final moisture content is adjustable by the addition of inert ingredients.

19. The process of claim 18 wherein the inert ingredients are either structural carbohydrates or silicates or a combination thereof.

20. The process of claim 1 wherein the mechanical working of the curd is done in a waterless cooker.

21. The process of claim 1 and further including:
cooling the cheese after the cheese is formed into the selected shape.

22. The process of claim 21 and further packaging the cooled cheese.

23. The process of claim 21 wherein the cheese is formed into either a circular, oval or rectangular cross-sectional shape between 0.25 inch to 15 inches in diameter or width or both in a horizontal or vertical plane.

24. The process of claim 1 wherein the cheese is formed into shape by being extruded directly into packaging.

25. The process of claim 1 wherein curd acidity is adjusted to a pH range of approximately 5.0 to 5.4.

26. A process of manufacturing a pasta filata cheese or a mozzarella-like cheese comprising:
providing a milk composition having a selected protein and fat composition;
pasteurizing the milk composition;
forming a coagulum from the milk composition;
cutting the coagulum to separate curd and whey;
draining the whey from the curd;
heating the curd to an approximate temperature range of 130° F. to 160° F.;
adding phosphate or citrate emulsifying salts or a combination thereof to the curd;
mechanically working the curd into a fibrous mass; and
forming the cheese into at selected shape.

27. The process of claim 26 wherein the emulsifying salt is an alkaline earth salt.

28. The process of claim 27 wherein the alkaline earth salt is a sodium potassium, calcium, magnesium salt.

29. The process of claim 26 wherein the salt is mixed into the curd in the form of an aqueous solution containing about 5 to 50% of the salt based on the weight of the solution.

30. The process of claim 29 wherein the aqueous solution is mixed into the curd for a period of time ranging from approximately 2 to 60 minutes prior to heating the curd.

31. The process of claim 26 wherein the cheese has a finished moisture content in the range of 40 to 60% after being formed into the selected shape.

32. The process of claim 26 wherein the temperature of the curd is in the approximate range of 20 to 160° F. when adding the emulsifying salts.

33. The process of claim 26 wherein the cheese is formed into the selected shape by being extruded into packaging.

34. The process of claim 26 wherein forming the cheese into the selected shape includes forming the cheese into an intermediate shaped extrudate by extrusion onto a chill roll or continuous belt.

35. The process of claim 26 wherein the cheese produced by the process of claim 30 is characterized by a shelf life of up to six months.

36. A process of manufacturing a pasta filata cheese or a mozzarella-like cheese comprising:
providing a milk composition having a selected protein and fat composition;
pasteurizing the milk composition;
forming a coagulum from the milk composition;
cutting the coagulum to separate curd and whey;
draining the whey from the curd;
adding generally recognized as safe ingredients into the curd in amounts effective to obtain selected compositional or functional properties in a final cheese product, the generally recognized as safe ingredients including cheese emulsifying salt, a non-dairy ingredient, or dairy ingredient, or any combination thereof;
heating the curd to a range of approximately 130 to 160° F.;
mechanically working the cheese curd into a fibrous mass; and
forming the cheese into a selected shape.

37. The process of claim 36 wherein heating, the curd to approximately 130 to 160° F. and mechanically working the cheese into a fibrous mass are separate and distinct steps.

38. The process of claim 36 wherein the cheese is formed into a selected shape by cooling.

39. The process of claim 36 wherein the cheese is packaged hot and then cooled.

40. The process of claim 36 wherein the cheese emulsifying salt comprises simple or complex chlorides or both, sulfates, phosphates or citrate cheese emulsifying salts or any combination thereof.

41. The process of claim 40 wherein the emulsifying salt is an alkaline earth salt.

42. The process of claim 41 wherein the alkaline earth salt contains sodium, potassium, calcium, magnesium or combination thereof.

43. The process of claim 40 wherein the salt composition is in a dry form and is mixed in an aqueous solution containing about 5 to 50 weight percent of the salt composition.

44. The process of claim 36 wherein the non-dairy ingredient comprises either functional carbohydrates, lipase, protease, mineral acid, organic acid, structural protein, or anti-microbial agents, or any combination thereof.

45. The process of claim 44 wherein the non-dairy ingredients are in dry form and are mixed in an aqueous solution containing about 5 to 50 weight percent of the non-dairy ingredient.

46. The process of claim 36 wherein the dairy ingredients comprise either a milk, cream, yogurt, skim solids, or cheese that is dried, condensed, fluid, unripened, fermented or pH reduced or any combination thereof.

47. The process of claim 46 wherein the dairy ingredient are in dry form and are mixed in an aqueous solution containing about 5 to 50 weight percent of the dairy ingredient.

48. The process of claim 36 wherein the cheese has a finished moisture content in the range of about 40 to 60 weight percent.

49. The process of claim 36 wherein the cheese is formed into either a circular, oval or rectangular cross-sectional shape between 0.25 inch to 15 inch diameter or with or both in a horizontal or vertical plain.

50. The process of claim 36 wherein the cheese is formed into shape by being extruded directly into packaging.

51. The process of claim 36 wherein the cheese is characterized by a shelf life of up to six months.

52. A process of manufacturing a pasta filata cheese or a mozzarella-like cheese comprising:
    providing a milk composition having a selected protein and fat composition;
    adding an acidifying agent to the milk composition;
    pasteurizing the milk composition after acidification;
    cutting the coagulum to separate curd and whey;
    draining the whey from the curd;
    heating the curd to an approximate temperature range of 130° F. to 160° F.;
    adding phosphate or citrate emulsifying salt or a combination therefore to the curd;
    mechanically working the curd into a fibrous mass; and
    forming the cheese into a selected shape.

53. The process of claim 52 wherein the emulsifying salt is an alkaline earth salt.

54. The process of claim 53 wherein the alkaline earth salt contains sodium, potassium, calcium, magnesium or combination thereof.

55. The process of claim 52 wherein the salt is mixed into the curd in the form of aqueous solution containing about 5 to 50% of the salt, based on the weight of the solution.

56. The process of claim 52 wherein the cheese has a moisture content in the range of 40 to 60% after being formed into the selected shape.

57. The process of claim 56 wherein the aqueous solution is mixed into the curd for a period of time ranging from 2 to 60 minutes prior to heating the curd.

58. The process of claim 52 wherein the temperature of the curd is in the approximate range of 20 to 160° F. when adding the emulsifying salts.

59. The process of claim 52 wherein the cheese is formed into the selected shape by being extruded into packaging.

60. The process of claim 52 wherein forming the cheese into the selected shape includes forming the cheese into an intermediate shaped extrudate by extrusion onto a chill roll or continuous belt.

61. The process of claim 52 wherein the cheese produced by the process of claim 30 is characterized by a shelf life of up to six months.

62. An improved process of manufacturing a pasta filata cheese or a mozzarella-like cheese, the improvement comprising:
    after a coagulum is formed from a milk composition, and the coagulum cut to separate the curd and whey and the whey drained from the curd, heating the curd in an aqueous free environment to an approximate temperature range of 130° F. to 160° F. and adding either a cheese emulsifying salt, a non-dairy ingredient or a dairy ingredient or any combination thereof and mechanically working the curd in the aqueous free environment until a mozzarella-type texture is achieved.

63. The process of claim 62 wherein the curd is comminuted to a selected size prior to heating.

64. The process of claim 62 wherein the coagulum is heated after being cut to facilitate further moisture removal from the curd.

65. The process of claim 64 wherein the pH of the drained curd is adjusted to a range of 5.2 to 5.4.

66. The process of claim 62 wherein the emulsifying salt includes simple or complex chlorides, phosphates or citrates or a combination thereof.

67. The process of claim 62 wherein the non-dairy ingredient includes a functional carbohydrate, a lipase, a protease, a mineral acid, an organic acid, a structural protein or an antimicrobial agent or a combination thereof.

68. The process of claim 62 wherein the dairy ingredient is either a milk, cream, yogurt, skim solids, or cheese that is dry, condensed, fluid, unripened, fermented or pH reduced or any combination thereof.

69. The process of claim 62 wherein the emulsifying salt, the dairy ingredient or the non-dairy ingredient if in dry form is mixed in an aqueous solution containing about 5 to 50% by weight of the emulsifying salt, the dairy ingredient or the non-dairy ingredient.

70. A process of manufacturing a pasta filata cheese or a mozzarella-like cheese comprising:
    providing a milk composition having a selected protein and fat composition;
    pasteurizing the milk composition;
    forming a coagulum from the milk composition;
    cutting the coagulum to separate curd and whey;
    draining the whey from the curd;
    heating the curd without aqueous immersion to an approximate temperature range of 130° F. to 160° F.;
    adding, a cheese emulsifying, salt composition, a non-dairy ingredient, a dairy ingredient or any combination thereof via a starter culture medium;
    mechanically working the curd into a fibrous mass; and
    forming the cheese into a selected shape.

71. The process of claim 70 wherein the curd is comminuted to a selected size.

72. The process of claim 70 wherein the coagulum is heated after being cut to facilitate moisture removal from the curd.

73. The process of claim 70 wherein the milk composition is fresh milk.

74. The process of claim 70 wherein the milk composition is recombined milk.

75. The process of claim 74 wherein the recombined milk is prepared from either protein concentrate, acid casein, rennet casein, caseinates, nonfat dry milk, whey, whey protein concentrate, whey protein isolate, cream, or condensed milk or any combination thereof.

76. The process of claim 70 wherein the emulsifying salt composition includes an alkaline earth salt of simple or complex chlorides, sulfates, phosphates or citrates used in the manufacture of process cheese, cheese food, cheese spread, cheese sauce or imitation or analog cheeses.

77. The process of claim 76 wherein the alkaline earth salt is a sodium, potassium, calcium, magnesium or salt.

78. The process of claim 70 wherein the non-dairy ingredient is a functional carbohydrate, a lipase, a protease, a mineral acid, an organic acid, a structural protein, or an antimicrobial agent or a combination thereof.

79. The process of claim 70 wherein the dairy ingredient is either a milk, cream, yogurt, skim solids, or cheese that is dry, condensed, fluid, unripened, fermented or pH reduced or any combination thereof.

80. The process of claim 70 wherein the cheese has a final moisture content in the range of about 20 to about 90 weight percent.

81. The process of claim 80 wherein the cheese has a final moisture content in the range of about 30 to 60 weight percent.

82. The process of claim 80 wherein the cheese final moisture content is adjustable by the addition of inert ingredients.

83. The process of claim 82 wherein the inert ingredients are either structural carbohydrates or silicates or a combination thereof.

84. The process of claim 70 wherein the mechanical working of the curd is done in a waterless cooker.

85. The process of claim 70 and further including:
cooling the cheese after the cheese is formed into the selected shape.

86. The process of claim 85 and further packaging the cooled cheese.

87. The process of claim 85 wherein the cheese is formed into either a circular, oval or rectangular cross-sectional shape between 0.25 inch to 15 inches in diameter or width or both in a horizontal or vertical plane.

88. The process of claim 85 wherein the cheese is formed into shape by being extruded directly into packaging.

89. A process of manufacturing a pasta filata cheese or a mozzarella-like cheese comprising:
providing a milk composition having a selected protein and fat composition;
pasteurizing the milk composition;
forming a coagulum from the milk composition;
cutting the coagulum to separate curd and whey;
draining the whey from the curd;
heating the curd without aqueous immersion to an approximate temperature range of 130° F. to 160° F.;
adjusting pH of the curd to a range of approximately 5.0 to 5.4 after the whey is drained;
mechanically working the curd into a fibrous mass; and
forming the cheese into a selected shape.

90. The process of claim 89 wherein the curd is comminuted to a selected size.

91. The process of claim 89 wherein the coagulum is heated after being cut to facilitate moisture removal from the curd.

92. The process of claim 89 wherein the milk composition is fresh milk.

93. The process of claim 89 wherein the milk composition is recombined milk.

94. The process of claim 93 wherein the recombined milk is prepared from either protein concentrate, acid casein, rennet casein, caseinates, nonfat dry milk, whey, whey protein concentrate, whey protein isolate, cream, or condensed milk or any combination thereof.

95. The process of claim 89 wherein the cheese has a final moisture content in the range of about 20 to about 90 weight percent.

96. The process of claim 95 wherein the cheese has a final moisture content in the range of about 30 to 60 weight percent.

97. The process of claim 95 wherein the cheese final moisture content is adjustable by the addition of inert ingredients.

98. The process of claim 97 wherein the inert ingredients are either structural carbohydrates or silicates or a combination thereof.

99. The process of claim 89 wherein the mechanical working of the curd is done in a waterless cooker.

100. The process of claim 89 and further including:
cooling the cheese after the cheese is formed into the selected shape.

101. The process of claim 100 and further packaging the cooled cheese.

102. The process of claim 100 wherein the cheese is formed into either a circular, oval or rectangular cross-sectional shape between 0.25 inch to 15 inches in diameter or width or both in a horizontal or vertical plane.

103. The process of claim 100 wherein the cheese is formed into shape by being extruded directly into packaging.

104. A process of manufacturing a pasta filata cheese or a mozzarella-like cheese comprising:
providing a milk composition having a selected protein and fat composition;
pasteurizing the milk composition after acidification;
adding an acidifying agent to the milk composition after pasteurization;
cutting the coagulum to separate curd and whey;
draining the whey from the curd;
heating the curd to an approximate temperature range of 130° F. to 160° F.;
adding phosphate or citrate emulsifying salt or a combination therefore to the curd;
mechanically working the curd into a fibrous mass; and
forming the cheese into a selected shape.

105. The process of claim 104 wherein the emulsifying salt is an alkaline earth salt.

106. The process of claim 105 wherein the alkaline earth salt is a sodium, potassium, calcium, magnesium or salt.

107. The process of claim 104 wherein the salt is mixed into the curd in the form of aqueous solution containing about 5 to 50% of the salt, based on the weight of the solution.

108. The process of claim 104 wherein the cheese has a moisture content in the range of 40 to 60% after being formed into the selected shape.

109. The process of claim 108 wherein the aqueous solution is mixed into the curd for a period of time ranging from prior to heating the curd.

110. The process of claim 104 wherein the temperature of the curd is in the approximate range of 20 to 160° F. when adding the emulsifying salts.

111. The process of claim 104 wherein the cheese is formed into the selected shape by being extruded into packaging.

112. The process of claim 104 wherein forming the cheese into the selected shape includes forming the cheese into an intermediate shaped extrudate by extrusion onto a chill roll or continuous belt.

113. The process of claim 104 wherein the cheese produced by the process of claim 30 is characterized by a shelf life of up to six months.

* * * * *

INTER PARTES REEXAMINATION CERTIFICATE (937th)

United States Patent
Dahlstrom et al.

(10) Number: US 6,319,526 C1
(45) Certificate Issued: Aug. 21, 2014

(54) PASTA FILATA CHEESE

(75) Inventors: Donald G. Dahlstrom, Oneida, WI (US); James Wiegand, Circle Pines, MN (US); William R. Aimutis, Blaine, MN (US)

(73) Assignee: The Chase Manhattan Bank, New York, NY (US)

Reexamination Request:
No. 95/000,003, Jan. 8, 2002
No. 90/006,317, Jul. 3, 2002

Reexamination Certificate for:
Patent No.: 6,319,526
Issued: Nov. 20, 2001
Appl. No.: 09/478,321
Filed: Jan. 6, 2000

(51) Int. Cl.
*A23C 19/00* (2006.01)
*A23C 19/06* (2006.01)
*A23C 19/068* (2006.01)
*A23C 19/09* (2006.01)

(52) U.S. Cl.
CPC ........... *A23C 19/063* (2013.01); *A23C 19/0684* (2013.01); *A23C 19/0917* (2013.01); *A23V 2002/00* (2013.01); *A23V 2250/032* (2013.01)
USPC ........................................................ 426/36

(58) Field of Classification Search
None
See application file for complete search history.

(56) References Cited

To view the complete listing of prior art documents cited during the proceedings for Reexamination Control Numbers 95/000,003 and 90/006,317, please refer to the USPTO's public Patent Application Information Retrieval (PAIR) system under the Display References tab.

*Primary Examiner* — Gary Kunz

(57) ABSTRACT

The present invention includes a process of manufacturing a mozzarella variety of cheese or a mozzarella-like cheese wherein a milk composition is pasteurized and formed into a coagulum. The coagulum is cut to separate curd from whey and the whey is drained therefrom. The curd is then heated preferably in a liquid-free environment and mechanically worked until the curd forms a fibrous mass. The cheese is then formed into a selected shape. Additionally, generally recognized as safe (GRAS) ingredients are added after the whey is drained but prior to beating the curd. In addition, the curd may be comminuted to a selected size after the whey is drained.

At the time of issuance and publication of this certificate, the patent remains subject to pending reissue application number 12/011,746 filed Jan. 29, 2008. The claim content of the patent may be subsequently revised if a reissue patent is issued from the reissue application.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 15, 32, 37, 58 and 104-113 are cancelled.

Claims 1, 10, 20, 26, 30, 36, 52, 57, 62, 63, 70, 84 and 89 are determined to be patentable as amended.

Claims 2-9, 11-14, 16-19, 21-25, 27-29, 31, 33-35, 38-51, 53-56, 59-61, 64-69, 71-83, 85-88 and 90-103, dependent on an amended claim, are determined to be patentable.

New claims 114-135 are added and determined to be patentable.

1. A process of manufacturing[,] a pasta filata cheese or a mozzarella-like cheese comprising:
   providing a milk composition having a selected protein and fat composition;
   pasteurizing the milk composition;
   forming a coagulum from the milk composition;
   cutting the coagulum to separate curd and whey;
   draining the whey from the curd;
   [heating the curd without aqueous immersion to an approximate temperature range of 130° F. to 160° F.; adding]
   *blending* a cheese emulsifying salt or a dairy ingredient or both *in with the curd to form a blend* prior to *heating and* mechanical working *of the blend*;
   [mechanically working the curd into a fibrous mass;]
   *heating the blend without aqueous immersion to an approximate temperature range of 130° F. to 160° F. while mechanically working the blend into a fibrous mass;* and
   forming the cheese into a selected shape.

10. The process of claim 1 wherein a non dairy ingredient is added to the curd prior to *heating and* mechanical working *of the blend*.

20. The process of claim 1 wherein the *heating and* mechanical working of the [curd] *blend* is done in a waterless cooker.

26. A process of manufacturing a pasta filata cheese or a mozzarella-like cheese comprising:
   providing a milk composition having a selected protein and fat composition;
   pasteurizing the milk composition;
   forming a coagulum from the milk composition;
   cutting the coagulum to separate curd and whey;
   draining the whey from the curd;
   [heating the curd to an approximate temperature range of 130° F. to 160° F.; adding]
   *blending* phosphate or citrate emulsifying salts or a combination thereof [to] *in with* the curd *to form a blend prior to heating and mechanical working of the blend;*
   *heating the blend by steam injection to an approximate temperature range of 130° F. to 160° F. while* mechanically working the curd into a fibrous mass; and
   forming the cheese into at selected shape.

30. The process of claim 29 wherein the aqueous solution is mixed into the curd for a period of time ranging from approximately 2 to 60 minutes prior to heating *and mechanically working* the [curd] *blend*.

36. A process of manufacturing a pasta filata cheese or a mozzarella-like cheese comprising:
   providing a milk composition having a selected protein and fat composition;
   pasteurizing the milk composition;
   forming a coagulum from the milk composition;
   cutting the coagulum to separate curd and whey;
   draining the whey from the curd;
   [adding] *blending* generally recognized as safe ingredients into the curd *to form a blend prior to heating and mechanical working of the blend* in amounts effective to obtain selected compositional or functional properties in a final cheese product, the generally recognized as safe ingredients including cheese emulsifying salt, a non-dairy ingredient, or dairy ingredient, or any combination thereof;
   heating [the curd] *the blend without aqueous immersion* to a range of approximately 130 to 160° F.[;] *while* mechanically working the [cheese curd] *blend* into a fibrous mass; and
   forming the cheese into a selected shape.

52. A process of manufacturing a pasta filata cheese or a mozzarella-like cheese comprising:
   providing a milk composition having a selected protein and fat composition;
   adding an acidifying agent to the milk composition;
   pasteurizing the milk composition after acidification;
   cutting the coagulum to separate curd and whey;
   draining the whey from the curd;
   [heating the curd to an approximate temperature range of 130° F. to 160° F.; adding]
   *blending* phosphate or citrate emulsifying salts or a combination [therefore to] *thereof in with the* the curd *to form a blend prior to heating and mechanical working of the blend;*
   *heating the blend without aqueous immersion to an approximate temperature range of 130° F. to 160° F. while* mechanically working the [curd] *blend* into a fibrous mass; and
   forming the cheese into a selected shape.

57. The process of claim 56 wherein the aqueous solution is mixed into the curd for a period of time ranging from 2 to 60 minutes prior to heating *and mechanically working* the [curd] *blend*.

62. An improved process of manufacturing a pasta filata cheese or a mozzarella-like cheese, the improvement comprising:
   after a coagulum is formed from a milk composition, and the coagulum cut to-separate the curd and whey and the whey drained from the curd, [heating the curd in an aqueous free environment to an approximate temperature range of 130° F. to 160° F. and adding] *blending* either a cheese emulsifying salt, a non-dairy ingredient or a dairy ingredient or any combination thereof *with the curd to form a blend without adding any heat during the blending* and *then heating the blend in an aqueous free environment to an approximate temperature range of 130° F. to 160° F. while* mechanically working the curd in the aqueous free environment until a mozzarella-type texture is achieved.

63. The process of claim 62 wherein the curd is comminuted to a selected size prior to heating *and mechanically working the blend.*

70. A process of manufacturing a pasta filata cheese or a mozzarella-like cheese comprising:
  providing a milk composition having a selected protein and fat composition;
  pasteurizing the milk composition;
  forming a coagulum from the milk composition;
  cutting the coagulum to separate curd and whey;
  draining the whey from the curd;
  [heating the curd without aqueous immersion to an approximate temperature range of 130° F. to 160° F.; adding,]
  *blending* a cheese emulsifying[,] salt composition, a non-dairy ingredient, a dairy ingredient or any combination thereof via a starter culture medium *with the curd to form a blend prior to heating and mechanical working of the blend*;
  heating the blend by steam injection to an approximate temperature range of 130° F. to 160° F. while mechanically working the [curd] *blend* into a fibrous mass; and
  forming the cheese into a selected shape.

84. The process of claim 70 wherein the *heating and* mechanical working of the [curd] *blend* is done in a waterless cooker.

89. A process of manufacturing a pasta filata cheese or a mozzarella-like cheese comprising:
  providing a milk composition having a selected protein and fat composition;
  pasteurizing the milk composition;
  forming a coagulum from the milk composition;
  cutting the coagulum to separate curd and whey;
  draining the whey from the curd;
  [heating the curd without aqueous immersion to an approximate temperature range of 130° F. to 160° F.;]
  adjusting pH of the curd to a range approximately 5.0 to 5.4 after the whey is drained *prior to heating and mechanical working of the curd*;
  heating the curd without aqueous immersion to an approximate temperature range of 130° F. to 160° F. while mechanically working the curd into a fibrous mass; and
  forming the cheese into a selected shape.

*114. A process of manufacturing a pasta filata cheese or a mozzarella like cheese comprising:*
  *providing a milk composition having a selected protein and fat composition;*
  *pasteurizing the milk composition;*
  *forming a coagulum from the milk composition;*
  *cutting the coagulum to separate curd and whey;*
  *draining the whey from the curd;*
  *blending a cheese emulsifying salt or a dairy ingredient or both or a non-dairy ingredient via a starter culture medium in with the curd to form a blend prior to heating and mechanical working of the blend;*
  *heating the blend without aqueous immersion to an approximate temperature range of 130° F. to 160° F. while mechanically working the blend into a fibrous mass; and*
  *forming the cheese into a selected shape.*

*115. The process of claim 114 wherein the coagulum is heated after being cut to facilitate moisture removal from the curd.*

*116. The process of claim 114 wherein the milk composition is fresh milk.*

*117. The process of claim 114 wherein the milk composition is recombined milk.*

*118. The process of claim 117 wherein the recombined milk is prepared from either protein concentrate, acid casein, rennet casein, caseinates, nonfat dry milk, whey, whey protein concentrate, whey protein isolate. cream, or condensed milk or any combination thereof.*

*119. The process of claim 114 wherein the salt composition includes an alkaline earth salt of simple or complex chlorides, sulfates, phosphates or citrates used in the manufacture of process cheese, cheese food, cheese spread, cheese sauce or imitation or analog cheeses.*

*120. The process of claim 114 wherein the alkaline earth salt contains sodium, potassium, calcium, magnesium or combination thereof.*

*121. The process of claim 119 wherein the salt composition if in dry form is mixed in an aqueous solution containing about five to fifty percent by weight of the salt composition.*

*122. The process of claim 114 wherein a non dairy ingredient is added to the curd prior to heating and mechanical working.*

*123. The process of claim 114 where the non-dairy ingredient is a functional carbohydrate, a lipase, a protease, a mineral acid, an organic acid, a structural protein, or an antimicrobial agent or a combination thereof.*

*124. The process of claim 114 wherein the dairy ingredient is either a milk, cream, yogurt, skim solids, or cheese that is dry, condensed, fluid, unripened, fermented or pH reduced or any combination thereof.*

*125. The process of claim 124 wherein the dairy ingredient is in dry form is mixed in an aqueous solution containing about five to fifty weight percent of the dairy ingredient.*

*126. The process of claim 114 wherein the cheese has a final moisture content in the range of about 20 to about 90 weight percent.*

*127. The process of claim 126 wherein the cheese has a final moisture content in the range of about 30 to 60 weight percent.*

*128. The process of claim 126 wherein the cheese final moisture content is adjustable by the addition of inert ingredients.*

*129. The process of claim 128 wherein the inert ingredients are either structural carbohydrates or silicates or a combination thereof.*

*130. The process of claim 114 wherein the heating and mechanical working of the blend is done in a waterless cooker.*

*131. The process of claim 114 and further including:*
  *cooling the cheese after the cheese is formed into the selected shape.*

*132. The process of claim 131 and further packaging the cooled cheese.*

*133. The process of claim 131 wherein the cheese is formed into either a circular, oval or rectangular cross-sectional shape between 0.25 inch to 1.5 inches in diameter or width or both in a horizontal or vertical plane.*

*134. The process of claim 114 wherein the cheese is formed into shape by being extruded directly into packaging.*

*135. The process of claim 114 wherein curd acidity is adjusted to a pH range of approximately 5.0 to 5.4.*

* * * * *